United States Patent
Beckmann (10) Patent No.: US 11,057,703 B2
(45) Date of Patent: Jul. 6, 2021

(54) APPARATUS AND METHOD FOR AUDIO USER INTERFACE PROCESSING WITH DISPARATE SAMPLING RATES

(71) Applicant: DSP CONCEPTS, INC., Santa Clara, CA (US)

(72) Inventor: Paul Eric Beckmann, Sunnyvale, CA (US)

( * ) Notice: Subject to any disclaimer, the term of this patent is extended or adjusted under 35 U.S.C. 154(b) by 0 days.

(21) Appl. No.: 16/866,793

(22) Filed: May 5, 2020

(65) Prior Publication Data

US 2021/0006898 A1 Jan. 7, 2021

Related U.S. Application Data (60) Provisional application No. 62/870,878, filed on Jul. 5, 2019.

(51) Int. Cl.
*H04R 3/00* (2006.01)
*G10L 21/02* (2013.01)
*H04R 3/02* (2006.01)

(52) U.S. Cl.
CPC ............... *H04R 3/02* (2013.01); *G10L 21/02* (2013.01)

(58) Field of Classification Search
CPC ... H04R 3/00; H04R 3/02; H04R 3/04; H04R 3/005; H04R 2410/01; H04R 2410/03; H04R 2410/05; G10L 21/02; G10L 21/0208; G10L 2021/02082; G10K 11/178; G10K 11/17879; G10K 11/17817; G10K 2210/505

See application file for complete search history.

(56) References Cited

U.S. PATENT DOCUMENTS

| | | | |
|---|---|---|---|
| 6,990,084 B2 * | 1/2006 | Hayward | H04B 3/23 370/287 |
| 8,320,554 B1 * | 11/2012 | Chu | H04M 9/082 379/406.08 |
| 9,659,558 B2 * | 5/2017 | Park | G10K 11/17817 |
| 2013/0066638 A1 * | 3/2013 | Mason | H04M 9/082 704/500 |
| 2019/0181911 A1 * | 6/2019 | Schulz | H04M 9/082 |

* cited by examiner

*Primary Examiner* — Thang V Tran
(74) *Attorney, Agent, or Firm* — Greensfelder, Hemker & Gale, P.C.; Mark E. Stallion (57) ABSTRACT

An apparatus and method for an audio user interface solution that avoids the time variation problems seen when using an acoustic echo canceler in an audio system. The solution as disclosed and claimed herein results in lower CPU usage in the audio system because a synchronous sample rate correction (SSRC) is performed on the sample rate multiple rate content and the asynchronous sample rate correction (ASRC) is applied on a small number of signals used to feed the ASRC.

6 Claims, 5 Drawing Sheets

APPARATUS AND METHOD FOR AUDIO USER INTERFACE PROCESSING WITH DISPARATE SAMPLING RATES

CROSS-REFERENCE TO RELATED APPLICATIONS

The present invention claims priority to and the benefit of U.S. Provisional Patent Application No. 62/870,878 filed Jul. 5, 2019, the contents of which are incorporated herein by reference and made a part hereof.

FEDERALLY SPONSORED RESEARCH OR DEVELOPMENT

N/A

BACKGROUND

Field

This technology as disclosed herein relates generally to audio systems and, more particularly, to audio systems using acoustic echo cancellation (AEC).

Background

Various audio systems, including sound bars, implement robust acoustic echo cancelers that have to operate with reference signals at different sample rates. Various voice enabled or audio enabled products utilize acoustic echo cancelers. For an echo canceler to work well, the digital-to-analog converters (DACs) driving the loudspeakers and the microphones need to be driven using the same sampling clock. It could be 48 kHz for speakers and 48 kHz for microphones. Or 48 kHz for speakers and 16 kHz for microphones, where the 16 kHz clock is exactly equal to the 48 kHz clock divided by 3. Or even 16 kHz for speakers and 16 kHz for the microphones.

The audio content to be played out the speakers is sample rate converted to the output DAC rate. This works fine when streaming content or playing back local content, like MP3 files. The AEC uses audio signals with a sampling rate of 16 kHz and thus the output signal is also at 16 kHz, or a multiple of 16 kHz, for example 48 kHz. 16 kHz is selected because it matches the sampling rate needed by the voice trigger algorithm and the voice recognition system.

The problem with Dolby content is that the sample rate of the content varies over a wide range. Possible rates are 44.1 kHz, 48 kHz, 88.2 kHz, 96 kHz, 176.4 kHz, and 192 kHz. Many audio product manufacturers want to avoid sample rate conversion and clock the DACs at the same rate as the content. If you now try to add an AEC to such a system (needed for voice user interface), you run into problems with the sample rates that are a multiple of 44.1 kHz. (The sample rates that are multiples of 48 kHz are OK because they are a multiple of 16 kHz and you can synchronously sample rate convert to 16 kHz). You now need a sample rate converter in the system and the question is where to put it.

A sampling rate converter conceptually converts a signal to continuous time at a first sampling rate and filters it to combine a reconstruction filter of a digital-to-analog (D/A) converter with an anti-aliasing filter of an analog-to-digital (A/D) converter, and then sampled at a second sampling rate to provide a signal with a converted signal sample rate. The converter is a time varying discrete time filter, where the ideal time varying filter has a kernel including samples of the ideal continuous time filter, spaced according to the sampling rates, and offset according to the instantaneous phase of the converter.

Using sample rate converters in audio is a standard practice. To convert from 44.1 kHz (or a multiple of 44.1 kHz) to 16 kHz requires an asynchronous sample rate converter (ASRC) because these 2 rates are not simple factors of each other. The problem with ASRCs is that they can introduce delay time variations as the algorithm adapts to slowly varying sample clocks. These time variations cause problems for echo cancelers because the echo canceler must continuously adapt to the time variation. If you place the ASRC in the AEC signal path, then it will reduce the performance of our product.

If you change the sampling rate by an integer factor, then you can use a synchronous sample rate converter (SSRC). This is a simpler algorithm and SSRC's don't introduce time variations. One potential placement is to place the ASRC is at the output of the Dolby Decoder. See FIG. 4. The figure is drawn for 44.1 kHz, but it applies to any sample rate which is not a multiple of 16 kHz. However, this won't work well because the ASRC is in the AEC signal path and then leads to time variations.

Another problem with placing the ASRC at the output of the Dolby decoder is that it can have a high sample rate and many channels. For example, it could be as bad as 176.4 kHz with over 10 channels. Running an ASRC on 10 channels at a high sample rate will be very computationally expensive.

A better apparatus and/or method is needed for improving AEC performance when there are disparate signal sampling rates.

SUMMARY

The technology as disclosed herein includes a method and apparatus for an audio user interface solution that avoids the time variation problems seen when using an acoustic echo canceler in an audio system. The solution as disclosed and claimed herein results in lower central processing unit (CPU) usage in the audio system because a synchronous sample rate correction (SSRC) is performed on the sample rate multiple rate content and the asynchronous sample rate correction (ASRC) is applied on a small number of signals used to feed the ASRC.

Figure 5:
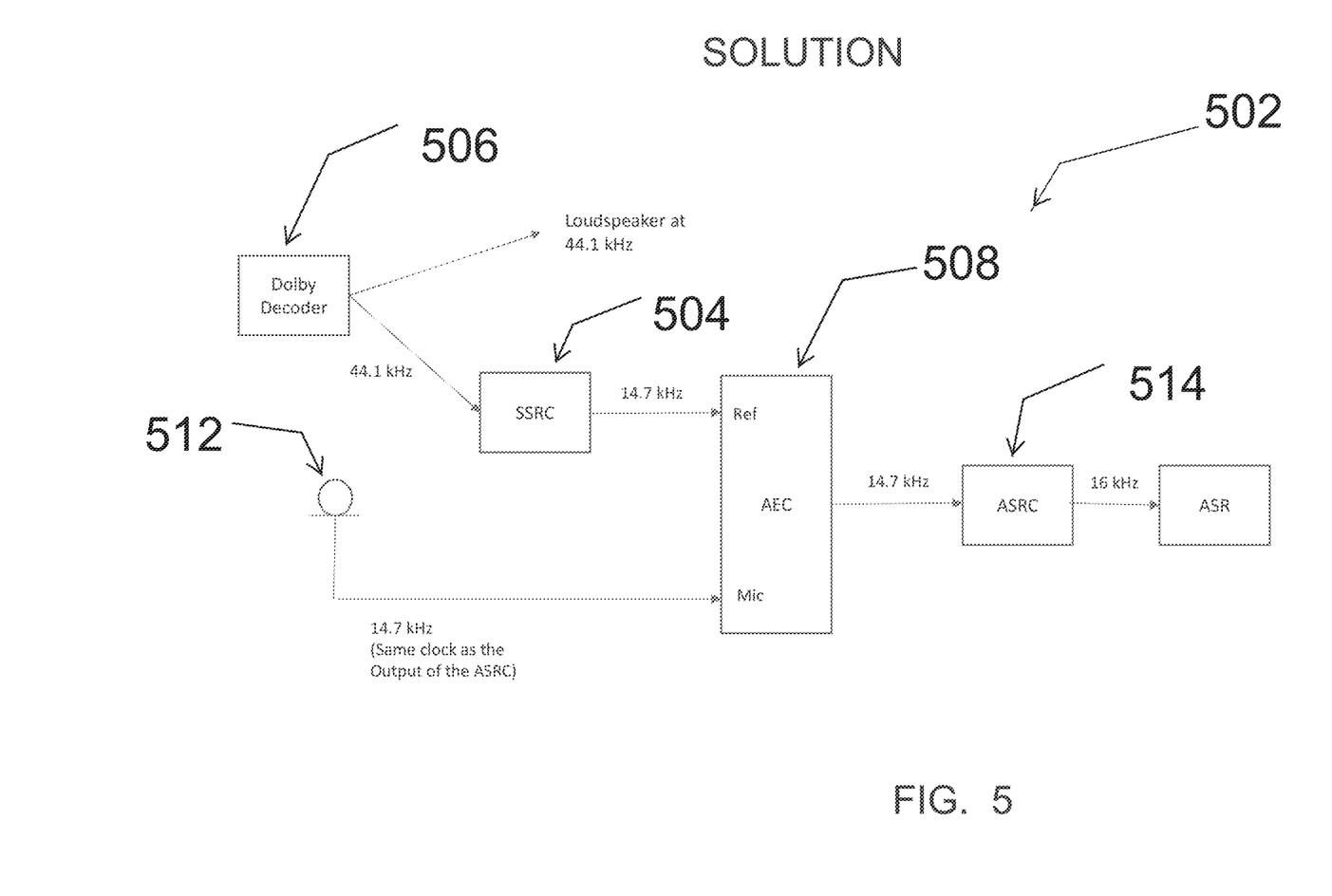
FIG. 5 is an illustration of a proposed solution to the aforesaid problems.

One implementation of the technology is to place the ASRC at the output of the AEC module as illustrated in FIG. 5. The loudspeakers and microphones will be driven off the same time base. This is generally referred to as the master time base. The AEC will operate at the master time base, or at the master time base divided by an integer thus allowing an SSRC to be used. There is now no time variation in the AEC path. The AEC will operate at the master time base, or at the master time base divided by an integer thus allowing an SSRC to be used. There is now no time variation in the AEC path. By way of illustration, assume that the content is 44.1 kHz. The AEC can be driven at 22.05 kHz (divide by 2) or 14.7 kHz (divide by 3) and then the output of the AEC asynchronously sample rate converted to 16 kHz.

Sampling rate converters are used in audio system applications when AEC are utilized because an audio-file discrete-time signal is sampled at a first sampling rate and this first sampling rate needs to be converted to another sampling of a voice user interface or microphone audio input for the AEC. A home theater system or a sound-bar are representative examples which would use such a system. If the ratio between the sampling rates is a constant integer factor, or a ratio of small integers, then a synchronous sampling rate converter (SSRC) can be used. If the ratio between the sampling rates vary over time, or is not a ratio of small integers, then an asynchronous sampling rate converter (ASRC) can be used. However, many home theatre systems including sound-bar systems utilize Dolby content and the problem with Dolby content is that the sample rate of the content varies over a wide range. Possible rates are 44.1 kHz, 48 kHz, 88.2 kHz, 96 kHz, 176.4 kHz, and 192 kHz. Many audio product manufacturers want to avoid sample rate conversion and clock the DACs at the same rate as the content. If you now try to add an AEC to such a system (needed for voice user interface), you run into problems with the sample rates that are a multiple of 44.1 kHz. (The sample rates that are multiples of 48 kHz are OK because they are a multiple of 16 kHz and you can synchronously sample rate convert to 16 kHz). You now need a sample rate converter in the system and the question is where to put it. The technology as disclosed and claimed herein addresses this problem.

SSRC's are typically utilized when there is a single master clock in a system. An illustration of this is a portable audio player that performs playback for audio-file content at a variety of sampling rates and must convert to a fixed output sampling rate, and where each of the sampling rates are multiples of the same master base sampling rate determined by the single master clock. ASRC's are typically utilized when there are multiple separate clocks in the system. An illustration of this is a system having multiple digital audio sources, such as seen in many home theatre systems including sound-bar systems, which utilize Dolby content and the problem with Dolby content is the sample rate of the content varies over a wide range, which may include sampling rates that are not a multiple of the same base sampling rate of the voice user interface. That said, sampling rate converters can be incorporated into a variety of consumer products, such as home theater systems. Converting all audio content to a single sampling-rate for subsequent equalization improves the design.

Sampling rate conversion can be done in either hardware or software. Hardware implementations include standalone integrated circuits. Also there are software solutions. For one implementation of the technology, an apparatus for audio user interface processing includes an acoustic echo cancellation system having a reference signal input preprocessed by a synchronous sample rate converter inputting to the reference signal input of the acoustic echo cancellation. A signal output of the acoustic echo cancellation system is post-processed by an asynchronous sample rate converter, where said asynchronous sample rate converter is receiving an acoustic echo cancelled output signal from the signal output of the acoustic echo cancellation system, and said asynchronous sample rate converter is outputting an ASRC output having a converted sample rate. A microphone signal sample rate AEC input is clocked to a clock of the ASRC output. For one implementation, the acoustic echo cancellation system, the synchronous sample rate converter, the acoustic echo cancellation system and the asynchronous sample rate converter are implemented with one or more micro-circuits. For one implementation of the acoustic echo cancellation system, the synchronous sample rate converter, the acoustic echo cancellation system and the asynchronous sample rate converter are implemented with one or more software modules.

One implementation of the technology is a method for processing an audio user interface, which includes, converting a sampling rate of an input signal with a synchronous sample rate converter and inputting a synchronously converted input signal into a reference input of an AEC. The method includes acoustic echo cancelling the reference input with the AEC and outputting an acoustic echo cancelling output signal and converting the sampling rate of an acoustic echo cancelled output signal of the AEC with an asynchronous sampling rate converter and outputting an asynchronously converted output signal. For one implementation a microphone signal sampling rate to the clock of the asynchronous sampling rate converter.

The features, functions, and advantages that have been discussed can be achieved independently in various implementations or may be combined in yet other implementations further details of which can be seen with reference to the following description and drawings.

These and other advantageous features of the present technology as disclosed will be in part apparent and in part pointed out herein below.

BRIEF DESCRIPTION OF THE DRAWINGS

For a better understanding of the present technology as disclosed, reference may be made to the accompanying drawings in which.

While the technology as disclosed is susceptible to various modifications and alternative forms, specific implementations thereof are shown by way of example in the drawings and will herein be described in detail. It should be understood, however, that the drawings and detailed description presented herein are not intended to limit the disclosure to the particular implementations as disclosed, but on the contrary, the intention is to cover all modifications, equivalents, and alternatives falling within the scope of the present technology as disclosed and as defined by the appended claims.

DESCRIPTION

According to the implementation(s) of the present technology as disclosed, various views are illustrated in FIGS. 1-5 and like reference numerals are being used consistently throughout to refer to like and corresponding parts of the technology for all of the various views and figures of the drawing. Also, please note that the first digit(s) of the reference number for a given item or part of the technology should correspond to the FIG. number in which the item or part is first identified. Reference in the specification to "one embodiment" or "an embodiment"; "one implementation" or "an implementation" means that a particular feature, structure, or characteristic described in connection with the embodiment or implementation is included in at least one embodiment or implementation of the invention. The appearances of the phrase "in one embodiment" or "in one implementation" in various places in the specification are not necessarily all referring to the same embodiment or the same implementation, nor are separate or alternative embodiments or implementations mutually exclusive of other embodiments or implementations.

One implementation of the present technology as disclosed comprising an audio user interface solution that avoids the time variation problems seen when using an acoustic echo canceler (AEC) in an audio system teaches an apparatus and method for utilization of an AEC in an audio system for playing back original audio content having various sampling rates.

Figure 1:
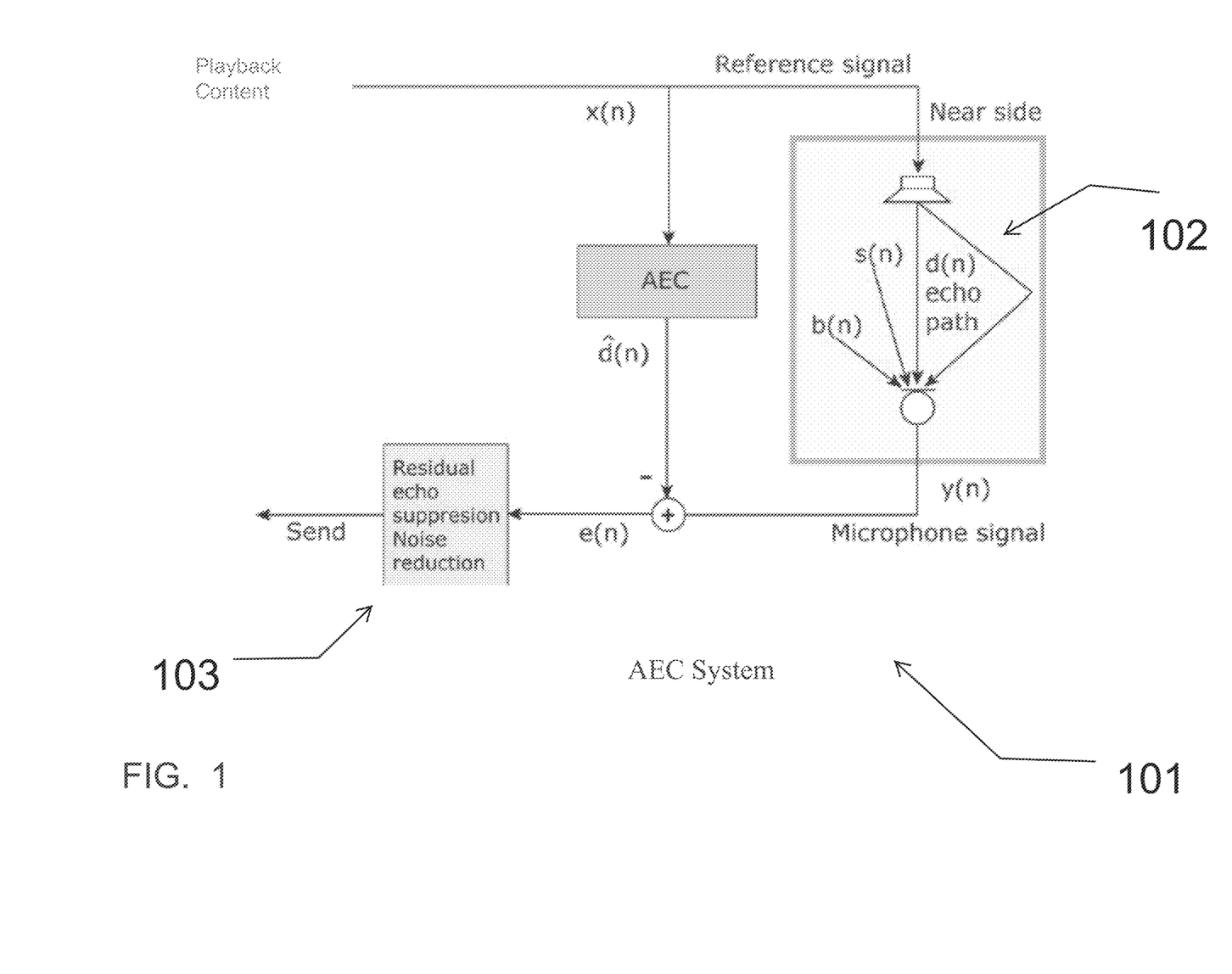
FIG. 1 is an illustration of a typical implementation a full-duplex Acoustic Echo Cancellation (AEC)

The details of the technology as disclosed and various implementations can be better understood by referring to the figures of the drawing. Referring to FIG. 1, an illustration of an implementation of a full-duplex Acoustic Echo Cancellation (AEC) system 101 is provided. Echoes occur because there is an acoustic path 102 between the speaker and the microphone array. The reference signal, x(n), is rendered by an audio file processed by a Dolby Decoder and D/A converters driving the speaker. The microphone signal, y(n), contains any talker speech signal, s(n), along with background noise, b(n) and the disturbances created by the unwanted echo, d(n). The AEC predicts the echo, or d'(n), and subtracts it from the microphone signal to create e(n), which is typically further processed by residual echo suppression 103, noise reduction, and other audio enhancement algorithms.

Figure 2:
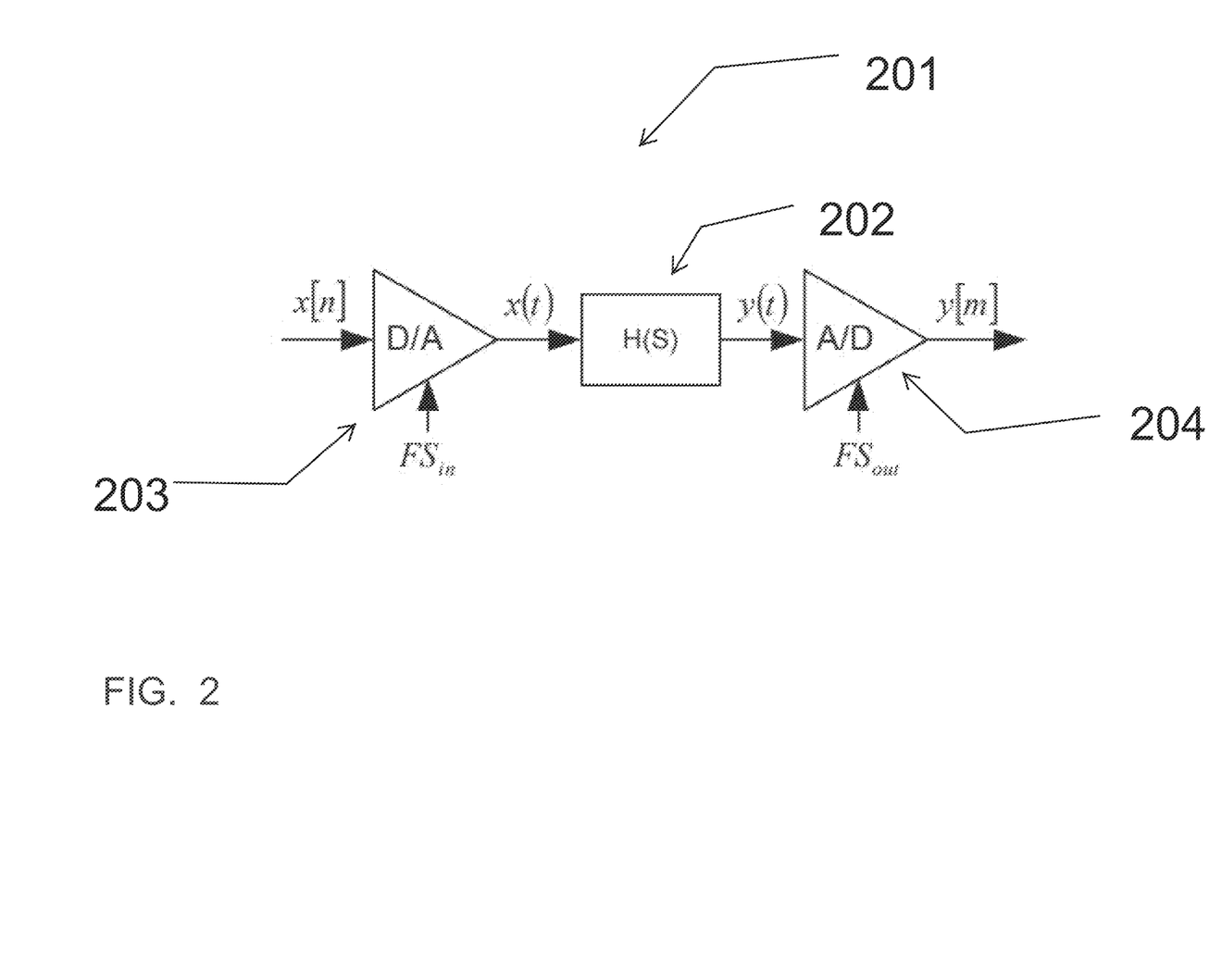
FIG. 2 is an illustration of a sampling rate converter.

Referring to FIG. 2, an illustration of a sampling rate converter 201 is provided. The signal x[n] is converted to continuous-time at a rate $FS_{in}$, filtered by a time varying filter H(s) 202, which combines the reconstruction filter of the D/A converter 203 with the anti-aliasing filter of the A/D converter 204, and then samples at a sampling-rate $FS_{out}$ to give the output y[m], which is the output signal with the converted sampling rate.

Figure 3:
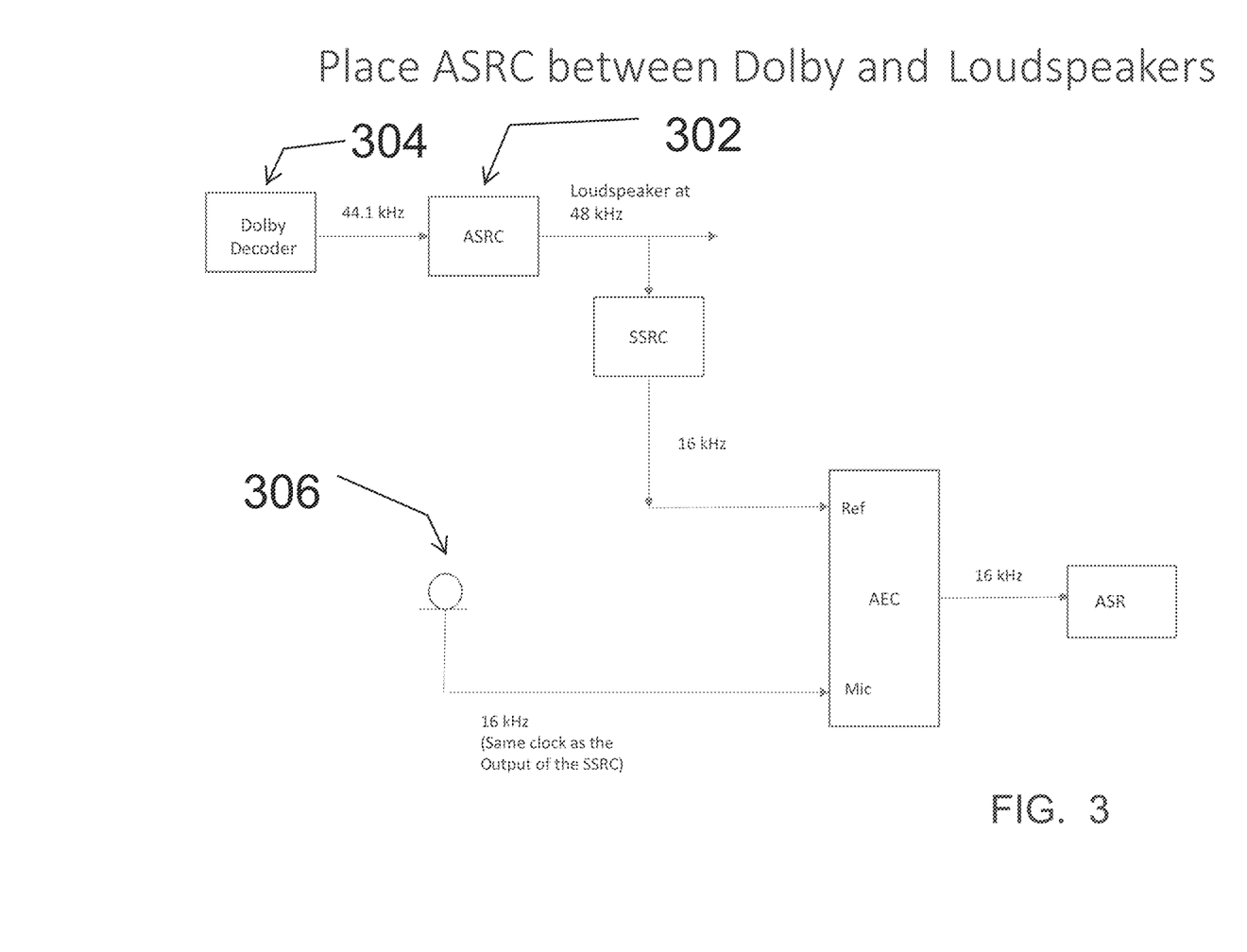
FIG. 3 is an illustration of a solution where the ASRC is placed between the Dolby Decoder and the speaker.

Referring to FIG. 3, an illustration of a solution where the ASRC 302 is placed between the Dolby Decoder 304 and the speaker is shown. This solution allows for the microphone 306 and the speaker to be on the same clock because the signal output which will drive the speaker is sample rate converter prior the speaker. This solution also avoids latency drift between the Dolby Decoder and the speaker. However, although latency drift is avoided, the problem is there will be playback latency between the Dolby Decoder and the speaker, which can cause synchronization issues with video, if the playback is of an audio visual file. This solution is also somewhat impractical in that several ASRC channels are typically required, which leads to a high CPU load when implementing a software based sampling rate converter. All content will be sample rate converted, which is typically not acceptable to many manufacturers. Manufacturers typically like for the playback sampling rate to coincide with the original content sampling rate.

Figure 4:
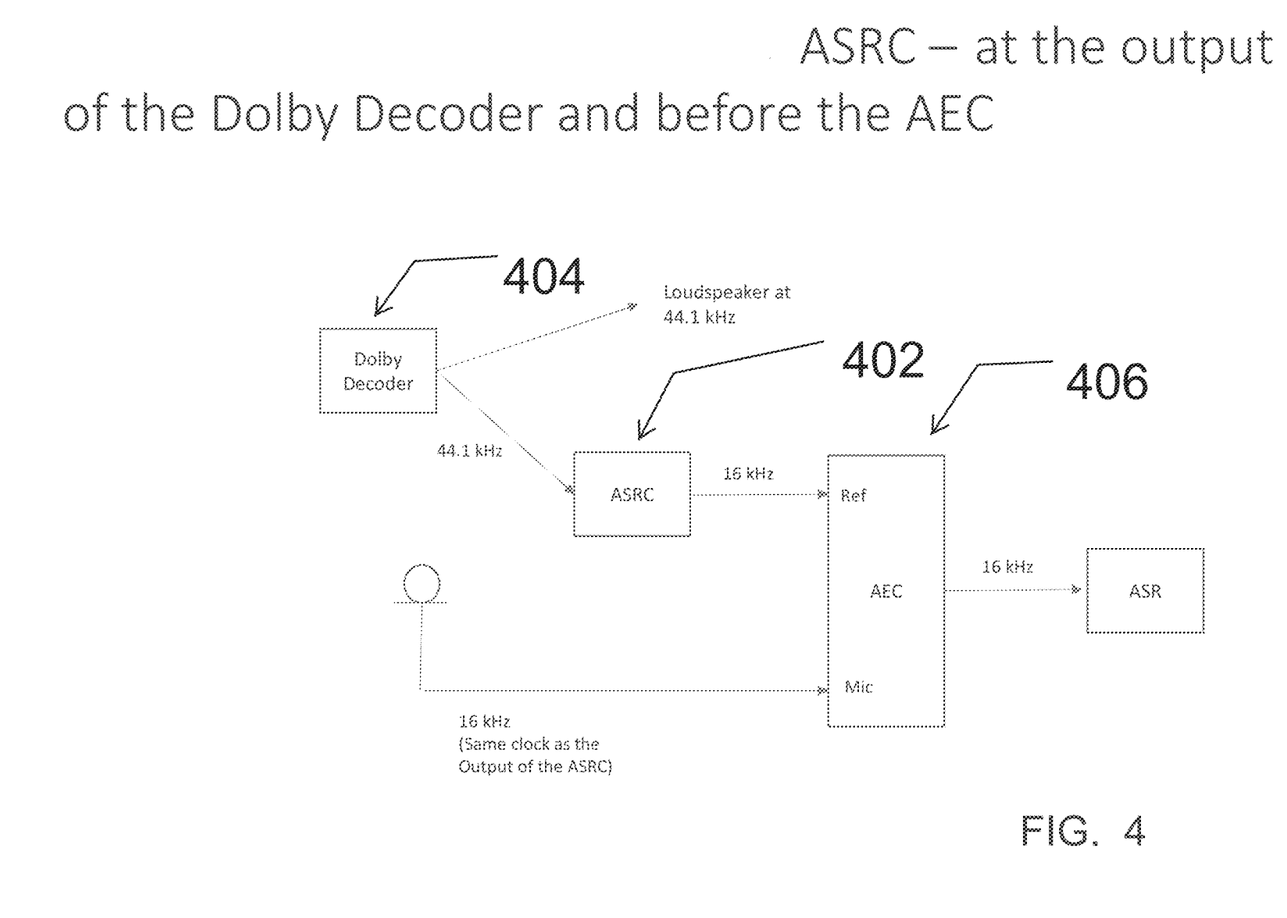
FIG. 4 is an illustration of a solution where the ASRC is placed at the output of the Dolby Decoder and before the AEC.

Referring to FIG. 4, an illustration of a solution where the ASRC 402 is placed at the output of the Dolby Decoder 404 and before the AEC 406 is shown. This solution poses several problems including several ASRC channels are typically required, which leads to a high CPU load when implementing a software based sampling rate converter. Given that the ASRC is in the path of the AEC, there will likely be latency drift and the AEC will perform improperly due to the latency drift because AEC's don't typically perform well with time varying delays due to the fact that they are continuously adjusting to the time varying delays as opposed to the conditions of the room; and further due to the speakers having a different sampling rate.

Referring to FIG. 5, a proposed solution 502 to the aforesaid problems is provided. A SSRC 504 is placed between the Dolby Decoder 506 and the AEC 508 and an ASRC 510 is placed at the output of the AEC 508. This allows for the speakers and the microphone 512 to be on the same clock. Further, there is no latency drift due to the speakers and the microphone and the AEC being on the same sampling rate. Therefore, the AEC performs as intended. The CPU load is lessened when using the SSRC at the output of the Dolby Decoder as compared to using an ASRC at the output. Further, only a single channel ASRC 514 is needed to convert the AEC 508 output to the desired sampling rate. Also, there is no latency between the Dolby Decoder 506 and the Speakers and there is no drift because the microphone is at the same sampling rate that the speakers are being driven. The sampling rate of the speaker is driven by the Dolby Decoder output, which is the sampling rate of the content and the mic is now at the same sampling rate as the speaker by using the same clock as the output of the ASRC. This solution doesn't force the analog to digital conversion of the AEC to run at a particular sampling rate, but instead has a flexible design such that the AEC can run at multiple sampling rates. The synchronous sampling rate converter performs the initial conversion of the signal output from the Dolby Decoder such that the AEC operates at the same sampling rate as the mic and the speaker. The ASRC now at the output of the AEC can now convert back to a desired sampling rate for the voice recognition engine.

One implementation of the technology as disclosed and claimed herein is an audio user interface including an acoustic echo cancellation system 508 having a reference signal input communicably coupled to an SSRC output of a synchronous sample rate converter 505 where the synchronous sample rate converter has a synchronous sampling rate converter function for synchronous sample rate converting a reference signal and outputting a sample rate converted reference signal through the SSRC output and to the reference signal input of the acoustic echo cancellation system 508. The technology includes a microphone input to the AEC 508 which is synchronously clocked with the reference signal input. An AEC output of the acoustic echo cancellation system 508 is communicably coupled to an ASRC input of an asynchronous sample rate converter 514, where the acoustic echo cancellation system 508 has an echo cancellation function for echo cancelling the microphone input and outputting an acoustic echo cancelled output signal of the acoustic echo cancellation system through the AEC output to the ASRC input of the asynchronous sample rate converter, and said asynchronous sample rate converter having an ASRC output for outputting an ASRC output having a converted sample rate. A microphone 512 and a Dolby Decoder 506 are also illustrated.

One implementation of the technology is a method for processing an audio user interface including synchronous sample rate converting a reference signal with a synchronous sample rate converter function of a synchronous sample rate converter. The method includes outputting a sample rate converted reference signal through an SSRC output of the synchronous sample rate converter to a reference signal input of an acoustic echo cancellation system and synchronously clocking a microphone input of the acoustic echo cancellation system with the reference signal input. For one implementation, the method includes echo cancelling the microphone input with an echo cancellation function of the acoustic echo cancellation system. The method includes outputting an acoustic echo cancelled output signal of the acoustic echo cancellation system through an AEC output to an ASRC input of the asynchronous sample rate converter and asynchronous sample rate converting the acoustic echo cancelled output signal with the asynchronous sample rate converter and outputting an ASRC output having a converted sample rate.

The various implementations and examples shown above illustrate a method and system for audio user interface processing for audio user interfaces utilizing AEC's. A user of the present method and system may choose any of the above implementations, or an equivalent thereof, depending upon the desired application. In this regard, it is recognized that various forms of the subject audio user interface method and system could be utilized without departing from the scope of the present technology and various implementations as disclosed. The AEC can also be expanded to include other voice related algorithms like beamforming and noise reduction.

As is evident from the foregoing description, certain aspects of the present implementation are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the scope of the present implementation(s). Accordingly, the specification and drawings are to be regarded in an illustrative rather than a restrictive sense.

Certain systems, apparatus, applications or processes are described herein as including a number of modules. A module may be a unit of distinct functionality that may be presented in software, hardware, or combinations thereof. For example, the sampling rate converter can be implemented in the system as an integrated circuit or as software. When the functionality of a module is performed in any part through software, the module includes a computer-readable medium. The modules may be regarded as being communicatively coupled. The inventive subject matter may be represented in a variety of different implementations of which there are many possible permutations.

The methods described herein do not have to be executed in the order described, or in any particular order. Moreover, various activities described with respect to the methods identified herein can be executed in serial or parallel fashion. In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separate embodiment.

In an example implementation, the machine operates as a standalone device or may be connected (e.g., networked) to other machines. For example, a sound-bar utilized the technology as disclosed may be networked with a home theater system or a home server network for storing and playing back audio files. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine or computing device. Further, while only a single machine is illustrated, the term "machine" shall also be taken to include any collection of machines that individually or jointly execute a set (or multiple sets) of instructions to perform any one or more of the methodologies discussed herein.

The example computer system and client computers can include a processor (e.g., a central processing unit (CPU) a graphics processing unit (GPU) or both), a main memory and a static memory, which communicate with each other via a bus. The computer system may further include a video/graphical display unit (e.g., a liquid crystal display (LCD) or a cathode ray tube (CRT)) and audio speakers. The computer system and client computing devices can also include an alphanumeric input device (e.g., a keyboard), a cursor control device (e.g., a mouse), a drive unit, a signal generation device (e.g., a speaker) and a network interface device.

The drive unit includes a computer-readable medium on which is stored one or more sets of instructions (e.g., software) embodying any one or more of the methodologies or systems described herein. The software may also reside, completely or at least partially, within the main memory and/or within the processor during execution thereof by the computer system, the main memory and the processor also constituting computer-readable media. The software may further be transmitted or received over a network via the network interface device.

The term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing or encoding a set of instructions for execution by the machine and that cause the machine to perform any one or more of the methodologies of the present implementation. The term "computer-readable medium" shall accordingly be taken to include, but not be limited to, solid-state memories, and optical media, and magnetic media.

The various audio processing examples shown above illustrate an apparatus and method for utilizing ASRC's with AEC's. A user of the present technology as disclosed may choose any of the above implementations, or an equivalent thereof, depending upon the desired application. In this regard, it is recognized that various forms of the subject technology could be utilized without departing from the scope of the present invention.

As is evident from the foregoing description, certain aspects of the present technology as disclosed are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the scope of the present technology as disclosed and claimed.

Other aspects, objects and advantages of the present technology as disclosed can be obtained from a study of the drawings, the disclosure and the appended claims.

What is claimed is:

1. An apparatus for audio user interface processing comprising:
   a synchronous sample rate converter (SSRC) to obtain a SSRC reference signal;
   a microphone to generated a microphone signal, which is synchronously clocked with the SSRC reference signal;

an acoustic echo cancellation (AEC) system having a reference signal input to receive the SSRC reference signal and having a microphone signal input to receive the microphone signal, where the synchronous sample rate converter has a synchronous sampling rate converter function for synchronous sample rate converting a reference signal and outputting SSRC reference signal;

an asynchronous sample rate converter (ASRC); and an AEC output of the AEC system communicably coupled to an ASRC input of the ASRC, where the acoustic echo cancellation system has an echo cancellation function for echo cancelling the microphone signal and outputting an acoustic echo cancelled output signal of the acoustic echo cancellation system through the AEC output to the ASRC input of the asynchronous sample rate converter, and said asynchronous sample rate converter to convert the acoustic echo cancelled output signal and output an ASRC output signal having a converted sample rate.

2. The apparatus as recited in claim 1, where the acoustic echo cancellation system, the synchronous sample rate converter and the asynchronous sample rate converter are implemented with one or more micro-circuits.

3. The apparatus as recited in claim 1, where the acoustic echo cancellation system, the synchronous sample rate converter and the asynchronous sample rate converter are implemented with one or more software modules.

4. A method for processing an audio user interface comprising:

synchronous sample rate converting a reference signal with a synchronous sample rate converter function of a synchronous sample rate converter (SSRC);

outputting a SSRC reference signal through an SSRC output of the synchronous sample rate converter;

obtaining a microphone signal which is synchronously clocked with the SSRC reference signal;

receiving the microphone signal and the SSRC reference signal by the acoustic echo cancellation (AEC) system;

synchronously clocking a microphone input of the acoustic echo cancellation system with the reference signal input;

echo cancelling the received microphone signal with an echo cancellation function of the acoustic echo cancellation system;

outputting an acoustic echo cancelled output signal of the acoustic echo cancellation system through an AEC output of the acoustic echo cancellation system; and receiving the acoustic echo cancelled signal by an asynchronous sample rate converter (ASRC), asynchronous sample rate converting the acoustic echo cancelled signal with the asynchronous sample rate converter and outputting an ASRC output signal having a converted sample rate.

5. The method as recited in claim 4, where the acoustic echo cancellation, the synchronously converted sample rate and the asynchronous sample rate conversion are implemented with one or more micro-circuits.

6. The method as recited in claim 4, where the acoustic echo cancellation, the synchronously converted sample rate and the asynchronous sample rate conversion are implemented with one or more software modules.

* * * * *